US012350223B2

(12) United States Patent
Zhijian

(10) Patent No.: US 12,350,223 B2
(45) Date of Patent: Jul. 8, 2025

(54) MASSAGE APPARATUS SYSTEM

(71) Applicant: Li Zhijian, Fuzhou (CN)

(72) Inventor: Li Zhijian, Fuzhou (CN)

(*) Notice: Subject to any disclaimer, the term of this patent is extended or adjusted under 35 U.S.C. 154(b) by 688 days.

(21) Appl. No.: 17/486,988

(22) Filed: Sep. 28, 2021

(65) Prior Publication Data

US 2023/0225933 A1 Jul. 20, 2023

Related U.S. Application Data

(63) Continuation of application No. 17/149,806, filed on Jan. 15, 2021, and a continuation of application No. 16/885,324, filed on May 28, 2020, now Pat. No. 11,337,887, and a continuation of application No. 16/850,043, filed on Apr. 16, 2020, now Pat. No. 11,344,469, and a continuation of application No. 16/693,259, filed on Nov. 23, 2019, now Pat. No. 11,426,324.

(51) Int. Cl.
*A61H 23/02* (2006.01)
*A45F 3/00* (2006.01)
*A45F 3/04* (2006.01)

(52) U.S. Cl.
CPC ............... *A61H 23/02* (2013.01); *A45F 3/04* (2013.01); *A45F 2003/003* (2013.01); *A45F 2003/045* (2013.01); *A61H 2201/1207* (2013.01); *A61H 2201/1626* (2013.01); *A61H 2201/165* (2013.01); *A61H 2201/5007* (2013.01); *A61H 2201/5043* (2013.01); *A61H 2205/081* (2013.01)

(58) Field of Classification Search
CPC ........ A61H 15/0078; A61H 2201/0157; A61H 2201/1215; A61H 2201/138; A61H 2201/1626; A61H 2201/1652; A45F 3/047; A45F 3/14; A47D 13/02
See application file for complete search history.

(56) References Cited

U.S. PATENT DOCUMENTS

| | | | |
|---|---|---|---|
| 3,957,184 | A | 5/1976 | Shurman |
| 6,816,760 | B1 | 11/2004 | Namaky |
| 6,870,089 | B1 | 3/2005 | Gray |
| 9,144,255 | B1 | 9/2015 | Perciballi |
| 9,780,344 | B2 | 10/2017 | Thiel |
| 10,288,384 | B2 | 5/2019 | Kinnings |
| 10,561,225 | B2 | 2/2020 | Parekh |
| 10,616,534 | B2 | 4/2020 | Thiel |
| 2002/0198031 | A1 | 12/2002 | Holmes |

(Continued)

FOREIGN PATENT DOCUMENTS

KR 1020140132850 A 11/2014

*Primary Examiner* — Brian D Nash
(74) *Attorney, Agent, or Firm* — Lippes Mathias LLP

(57) ABSTRACT

A massaging apparatus system with a body having at least one shoulder strap, and a back panel, both with first inner layer, a second inner layer, a first outer layer and a second outer layer; an opening on the body and an opening fastener; at least one massage head; a control circuit with at least one cable connected to the massage heads, a substantially closed storage space between the first inner layer and the second inner layer. The first outer layer communicates with the user when worn. The first inner layer having a small storage space fixed firmly on the first inner layer and configured to receive the at least one massage head and having a second opening for the at least one massage head and cable to go through.

23 Claims, 20 Drawing Sheets

(56) References Cited

U.S. PATENT DOCUMENTS

| | | | |
|---|---|---|---|
| 2003/0062391 | A1 | 4/2003 | Mitchell |
| 2003/0168488 | A1 | 9/2003 | Ho |
| 2005/0020184 | A1 | 1/2005 | Izcoa |
| 2005/0140331 | A1 | 6/2005 | McQuade |
| 2006/0113343 | A1 | 6/2006 | Chang |
| 2007/0297149 | A1 | 12/2007 | Richardson |
| 2008/0011799 | A1 | 1/2008 | Chang |
| 2008/0125164 | A1 | 5/2008 | Singh |
| 2008/0210728 | A1 | 9/2008 | Bihn |
| 2009/0061926 | A1 | 3/2009 | Lee |
| 2009/0201671 | A1 | 8/2009 | Huntley |
| 2009/0224722 | A1 | 9/2009 | Causey |
| 2009/0276089 | A1 | 11/2009 | Bartholomew |
| 2010/0155447 | A1 | 6/2010 | Zheng |
| 2011/0110514 | A1 | 5/2011 | Gustavsson |
| 2012/0262117 | A1 | 10/2012 | Ferber |
| 2012/0299528 | A1 | 11/2012 | Scarmozzino |
| 2013/0026726 | A1 | 1/2013 | Thomas |
| 2013/0162389 | A1 | 6/2013 | Crucs |
| 2013/0214931 | A1 | 8/2013 | Chia |
| 2013/0249673 | A1 | 9/2013 | Ferrari |
| 2014/0002239 | A1 | 1/2014 | Rayner |
| 2014/0061273 | A1 | 3/2014 | Bullivant |
| 2014/0171132 | A1 | 6/2014 | Ziemianska |
| 2015/0296644 | A1 | 10/2015 | Chin |
| 2015/0326044 | A1 | 11/2015 | Ashley |
| 2015/0359127 | A1 | 12/2015 | Daoura |
| 2015/0366333 | A1 | 12/2015 | Zhijian |
| 2016/0095782 | A1 | 4/2016 | Shockley, Jr. |
| 2016/0095788 | A1 | 4/2016 | Cottrell |
| 2016/0112004 | A1 | 4/2016 | Thiel |
| 2016/0141904 | A1 | 5/2016 | Zhijian |
| 2017/0027806 | A1 | 2/2017 | Lin |
| 2017/0196347 | A1 | 7/2017 | Sawhney |
| 2019/0343266 | A1 | 11/2019 | Parekh |
| 2019/0374012 | A1 | 12/2019 | Chang |
| 2020/0222274 | A1 | 7/2020 | Zhijian |
| 2020/0222278 | A1 | 7/2020 | Zhijian |
| 2020/0330316 | A1 | 10/2020 | Zhijian |
| 2020/0330317 | A1 | 10/2020 | Zhijian |
| 2021/0137784 | A1 | 5/2021 | Zhijian |
| 2022/0168178 | A1 * | 6/2022 | Zhijian .................. A61H 23/02 |
| 2023/0338226 | A1 * | 10/2023 | Zhijian ..................... A45F 3/04 |

* cited by examiner

1700

MASSAGE APPARATUS SYSTEM

The invention relates to the field of backpacks, in particular to a back massage system or bags with a replaceable structure and convenient manufacturing.

The existing backpack provides convenience for people to travel with items, but there are still the following defects: because of the weight of items in the backpack, the backpack user's shoulder, back and waist may under high pressure, over a long time, the backpack users will feel uncomfortable, easy to feel fatigue and pain, and may cause damage to the user's health. With the progress of science and technology, a backpack with massage function has been designed on the traditional backpack. Because the massage head of the massage backpack is vulnerable, in the process of use, if the massage head is damaged, the whole massage system needs to be replaced, because the whole back of the existing backpack design is stitched through stitches. When replacing the massage apparatus, the stitches of the whole back need to be removed, which is very time-consuming and laborious. The consumer may be unable to remove the stitches and replace the massage apparatus by themselves, so it may take time and waste back and forth carrier freight fees to deliver the whole backpack to get the massage apparatus replacement.

The advantage of this new invention is, creating a new special sewing bag structure, an innovative structure of simple, convenient and rapid replacement of internal massage devices may be performed by the consumer themselves, without the necessity to take off the stitching on the bag body. It would also not be needed to send the bag back to merchant's after-sales service center.

The purpose of the invention is to provide a wearable back massage system. The main body of the system adopts a double structure the main body set up providing an open and flexible storage bag, allowing consumers to simply and quickly replace the internal massage device without having to remove stitching of the main body, and this special structure also allows for the entire backpack body to be easily manufactured.

The invention is realized through the following technical scheme: a massage backpack back system, having the main body with a back panel and shoulder strap, the back panel and shoulder strap are connected by the first layer body and the second layer body, and a storage space is formed between the first layer body and the second layer body, the main body is also provided with at least one connected storage space opening, the opening through fasteners closed connection. There may also be at least one massage head for massaging the human body and a control circuit. The control circuit and the massage head may be installed in a substantially closed storage space, and the control circuit is connected with the massage head through cables to control the massage head work. A small storage space for installing the massage head is arranged in the substantially closed storage space, one side of the small storage space is provided with a second opening for the massage head and cable going through, the storage bag is flexible and clamped on the outer circumference of the massage head.

In order to facilitate the control of the massage head, it also includes a functional control board connected with the control circuit. Preferably, the functional control board is connected to the control circuit by cable. In order to facilitate the use of the user, the functional control board is fixed on the main body, and the functional control board is provided with a rigid base. Preferably, the functional control panel is provided with a control button, and the control button is fixed in a through hole of the first inner and first outer layer of body, in which the layer in contact with the human body. In order to facilitate replacement and installation, the cable between the functional control board and the control circuit is provided with a fast disconnecting connector. Preferably, the small storage space is made of any or a combination of elastic fabric, foam material, neoprene, rubber, silica, leather, artificial leather and synthetic materials. In order to facilitate power supply, the main body is provided with a power storage space and a power supply device installed therein, and the power supply device is connected with the control circuit through a cable extending from the storage space. In order to facilitate the removal and assembly of the shoulder strap massage head, the shoulder strap is provided with a massage head, and the shoulder strap is provided with a third opening for convenient replacement of the massage head. Preferably, the number of shoulder straps is two, and the third opening is arranged between the two shoulder straps or arranged on corresponding shoulder straps respectively.

In order to facilitate the disassembly and assembly of the massage device, the cable between the control circuit and the massage head is also provided with a fast disassembly connector that can quickly disconnect and connect the cable. In order to facilitate the disassembly and assembly of the massage head on the back panel, the back panel is provided with a massage head corresponding to the waist position, and the back panel is provided with a fourth opening for convenient replacement of the massage head.

In order to reduce the noise generated by the resonance of the massage head, a sound falling (absorbing) layer is arranged between the first layer body and the second layer body, and the massage head is divided with other part of massage apparatus by a sound falling layer. Preferably, the sound falling layer is a foamed material. In order to reduce the noise generated by the resonance of the massage head, the opening fastener adjacent to the massage head is a zipper, the zipper comes without any hard puller that make noise from resonance.

A massaging apparatus system with a convenient manufacturing and replaceable structure, wherein a webbing on top of the shoulder strap connecting to the body to strengthen the shoulder strap, and there's a loop on the shoulder strap holding the webbing ends to reduce the noise from webbing waving.

A massaging apparatus system with a convenient manufacturing and replaceable structure, wherein a webbing on top of the shoulder strap is provided connecting to the body to strengthen the shoulder strap, and there's a pair of Velcro (hook and loop fastener) on the shoulder strap and webbing sticking the webbing ends to reduce the noise from webbing waving.

Compared with the previous technology, the beneficial effects of the invention are as follows: 1. The invention of a new massage backpack back system, the main body of the system adopts a double layer structure, an opening and an elastic storage space are set on the main body, so that consumers can easily and quickly replace the internal massage device, and without removing the main body of the stitching, and the whole back main body is convenient to production and manufacturing. 2. The invention of a massage backpack back system, the back system and other parts of the backpack is an independent structure, it can directly sewed up the whole back system to other parts of bags to complete the sewing of the entire body of backpack, this can improve the production efficiency. 3. The invention has a new massage backpack back system, which is provided with a functional control board, and the control adopts a rigid base, which is convenient for the user to press the button for operation and control. 4. The invention relates to a new massage backpack back system, wherein a quick disassembly connector is used to connect the massage head and the control circuit to further facilitate the disassembly and assembly by workers or consumer users. 5. A new massage backpack back system is provided with a sound drop layer made of foam material between the first inner layer and the second inner layer, which can reduce the noise generated by resonance and improve the user experience.

DETAILED DESCRIPTION OF THE INVENTION

Figure 1:
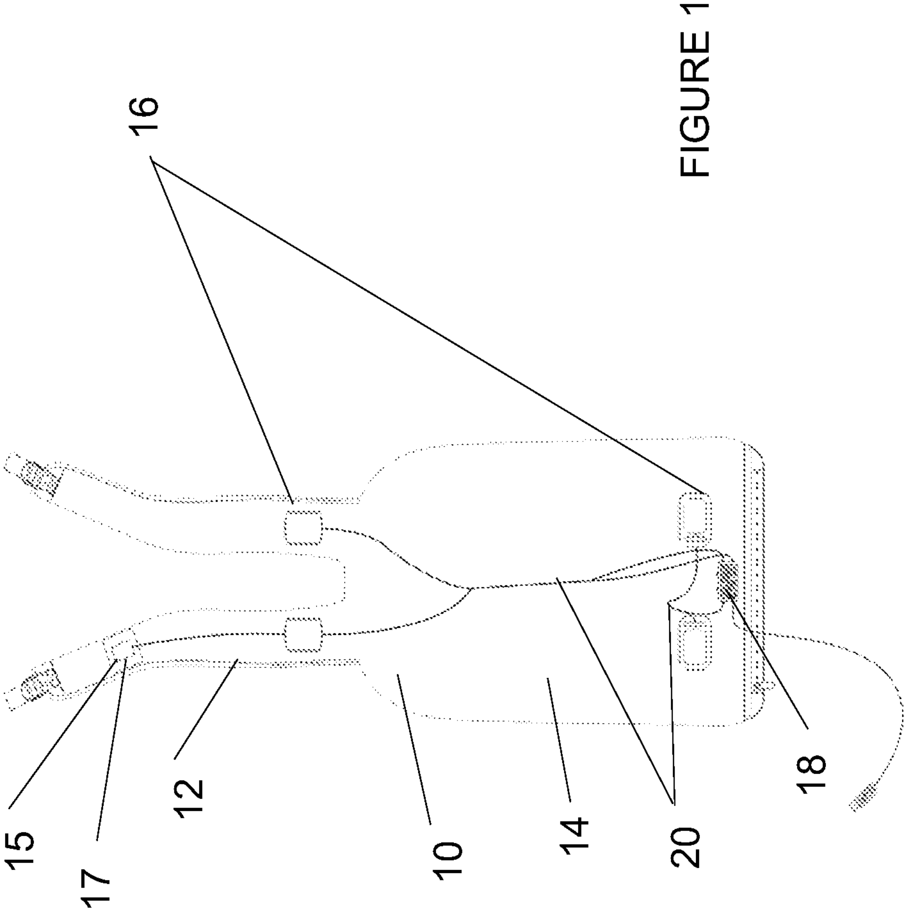
FIGS. 1, 2, 3, 4, 5, 6, 7, 8, 9, 10, 11, 12, 13, 14, 15, 16, 17, 18, 19 and 20 depict the present invention.
Figure 2:
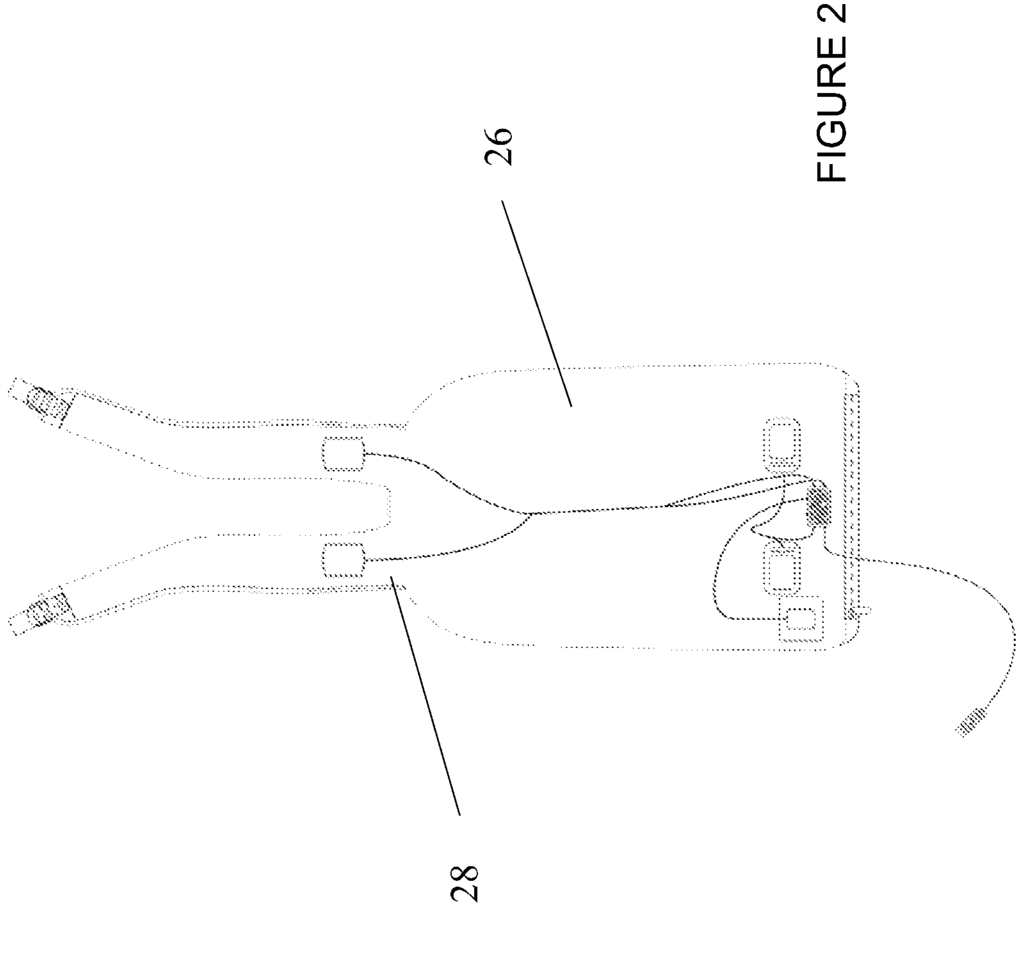
Figure 3:
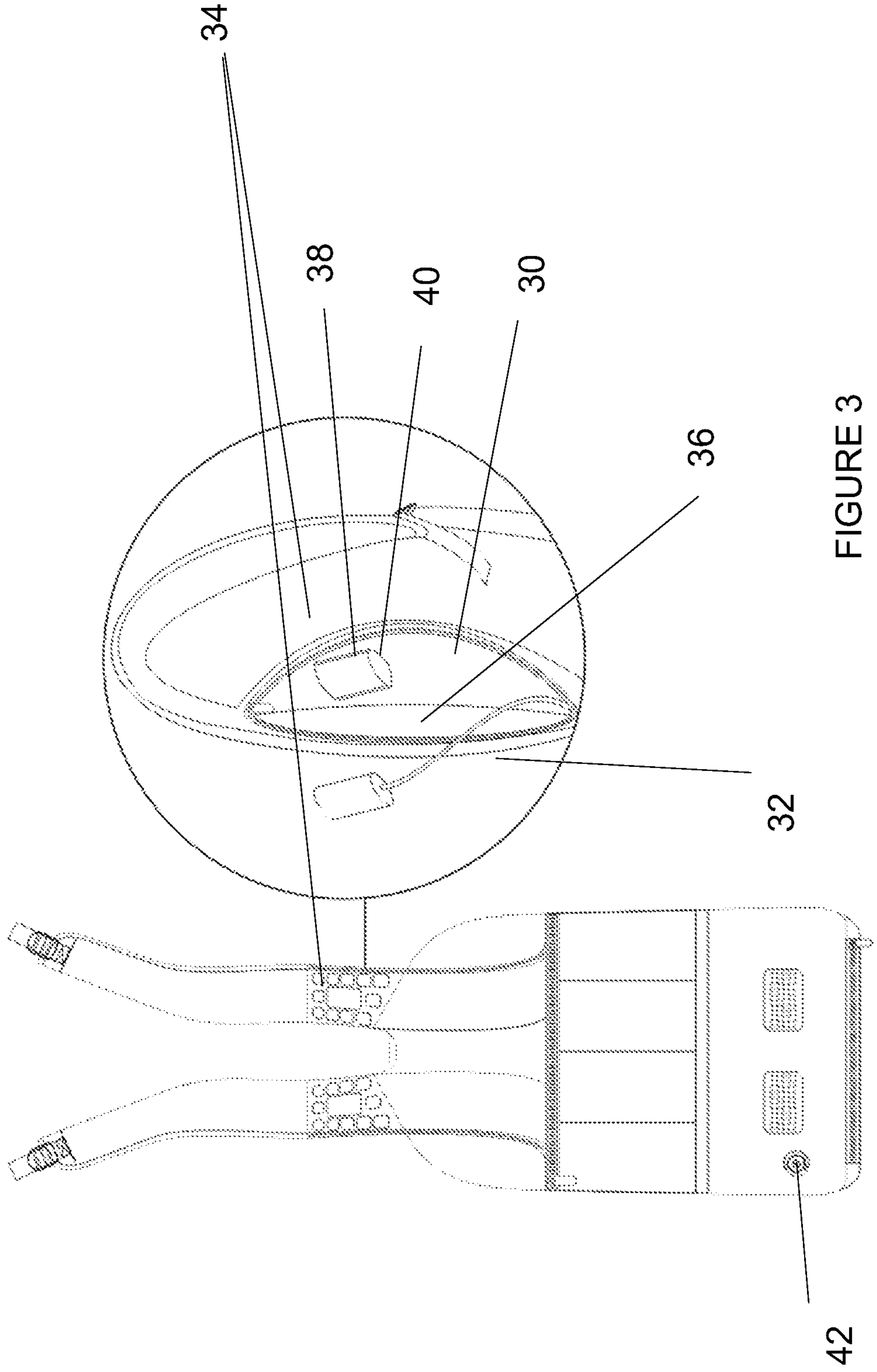
Figure 4:
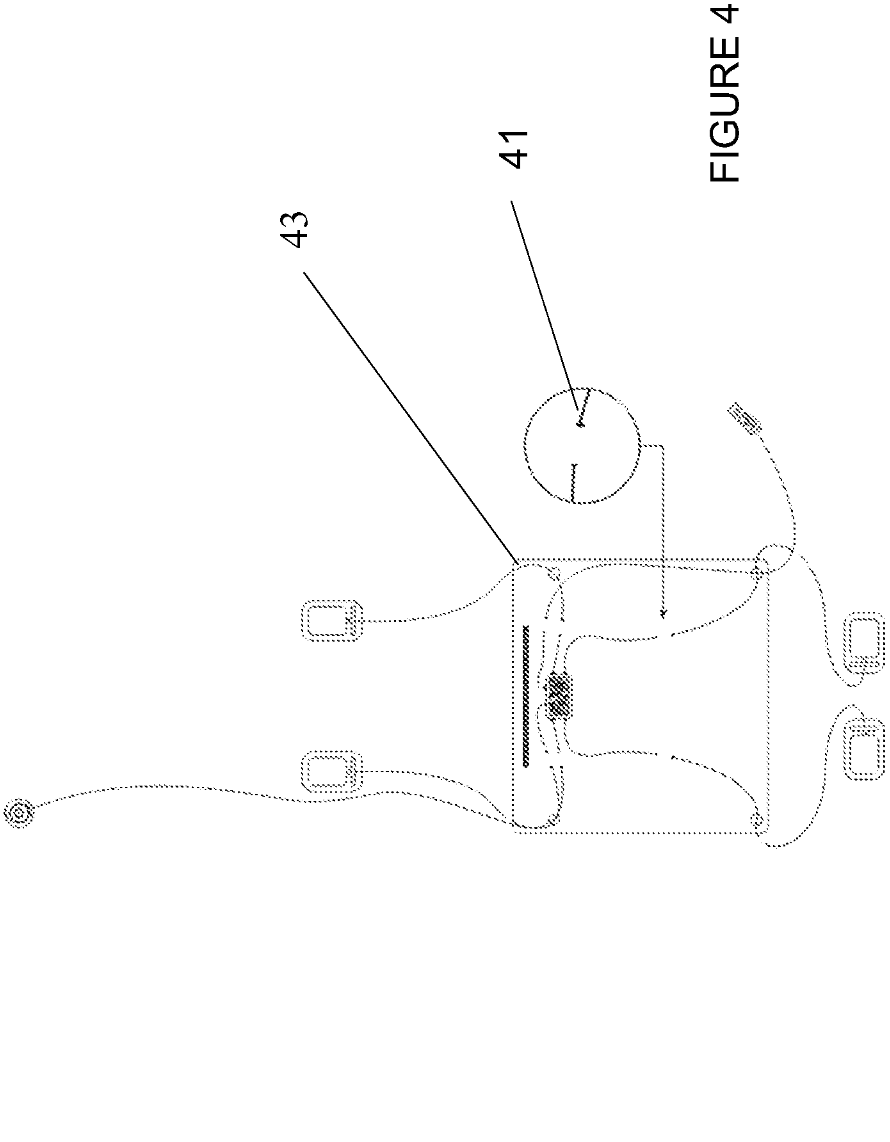
Figure 5:
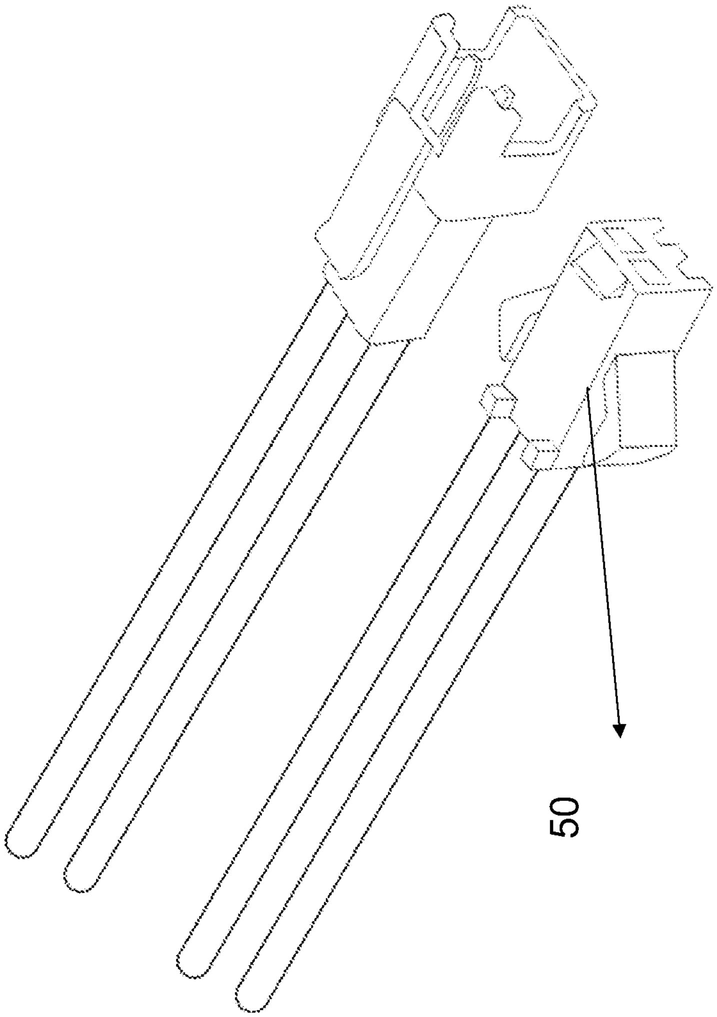
Figure 6:
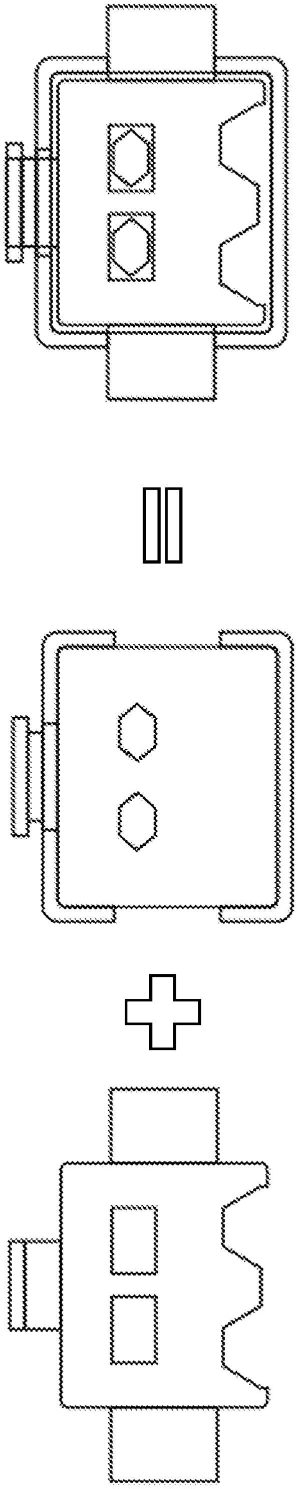
Figure 7:
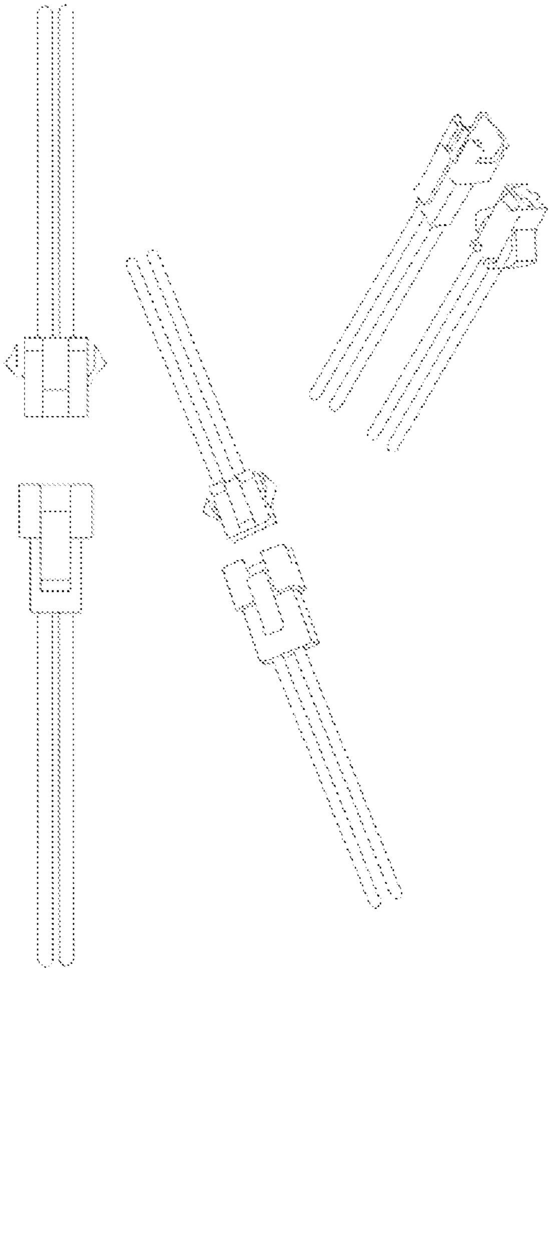
Figure 8:
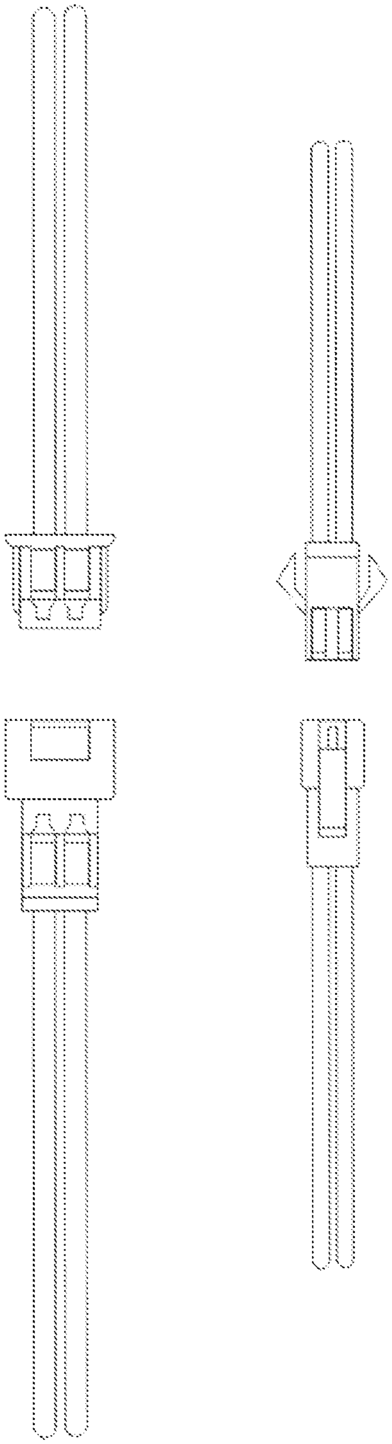
Figure 9:
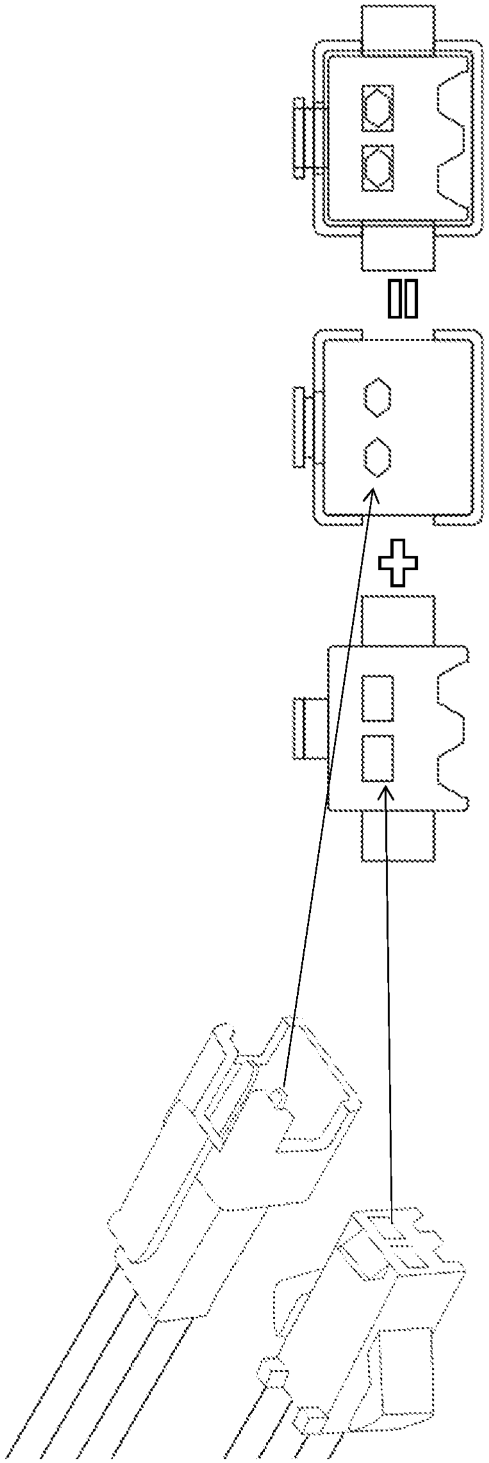
Figure 10:
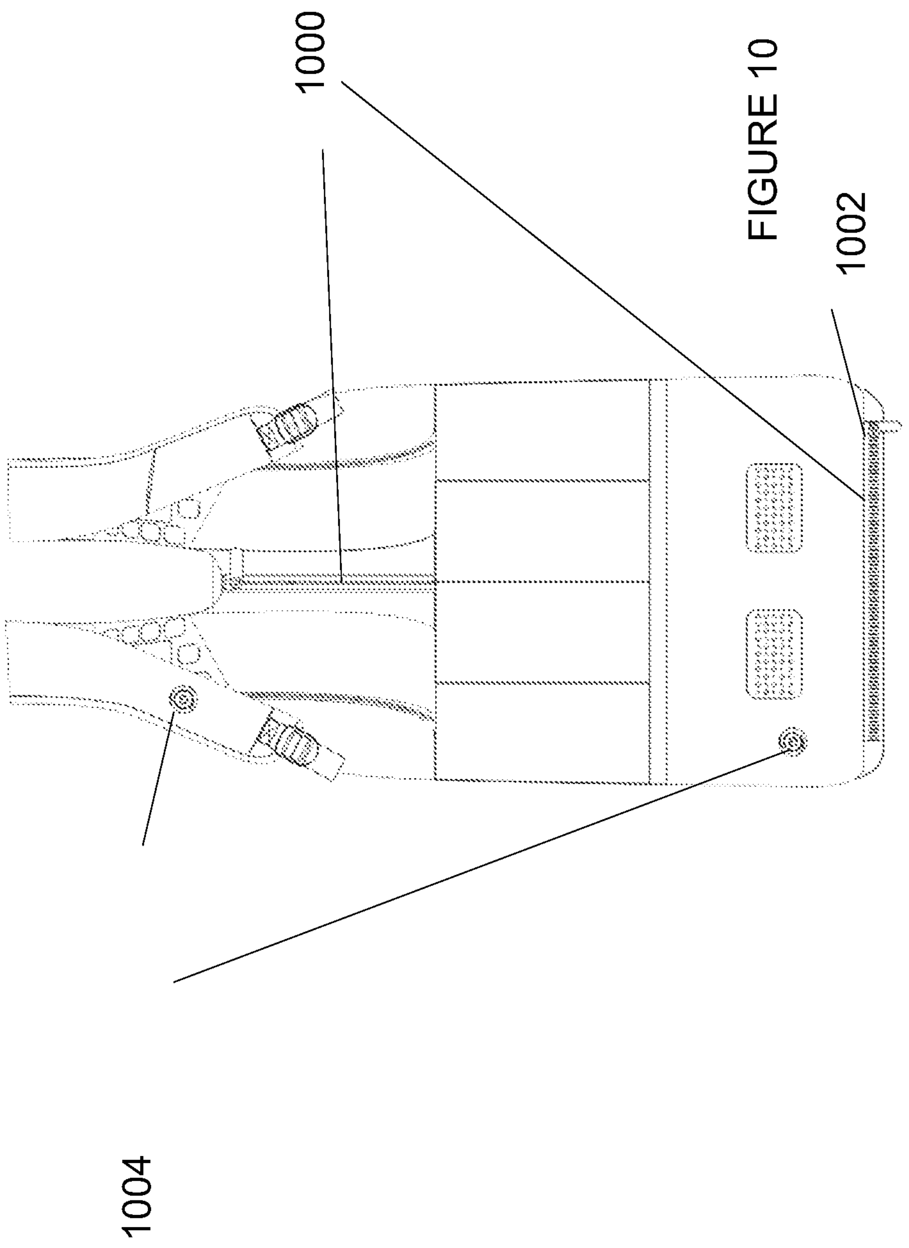
Figure 11:
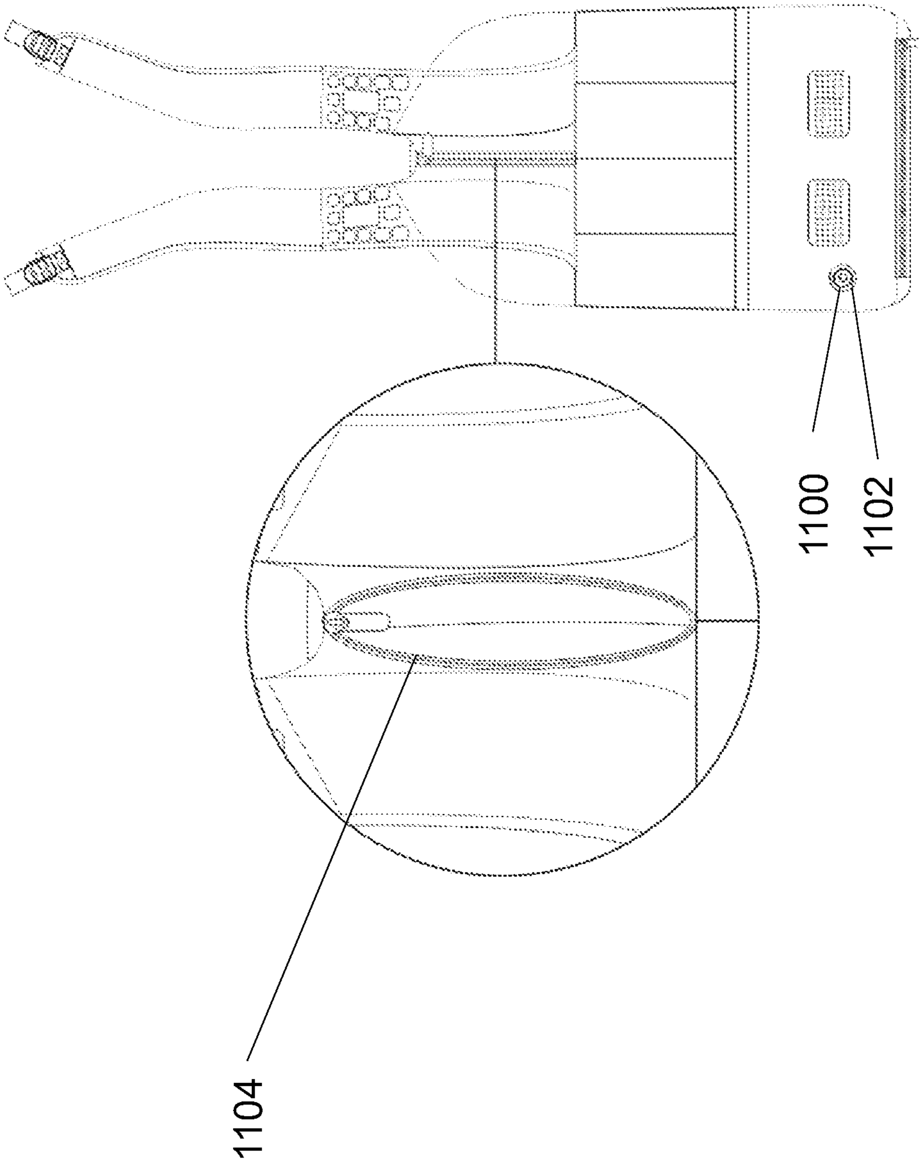
Figure 12:
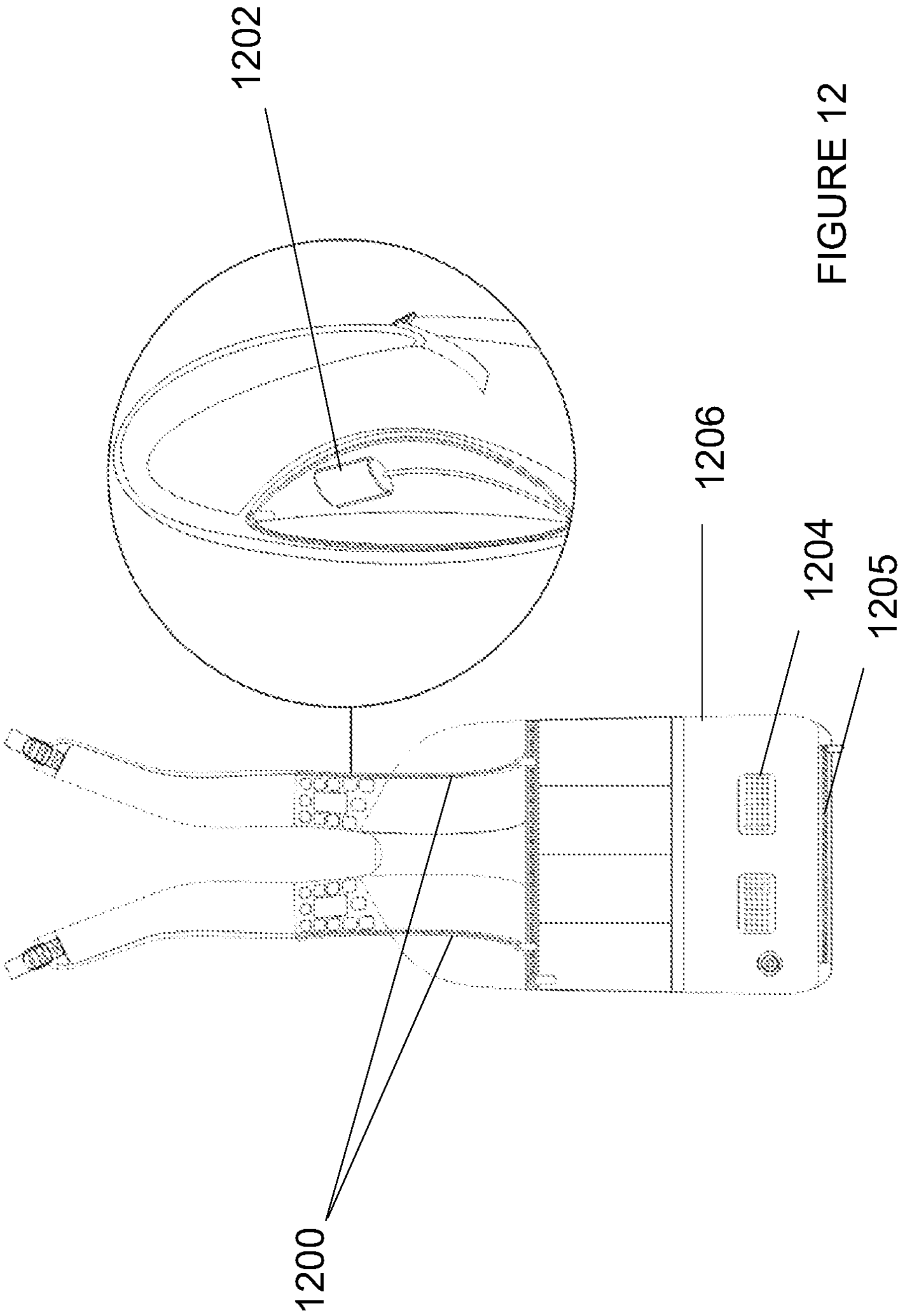
Figure 13:
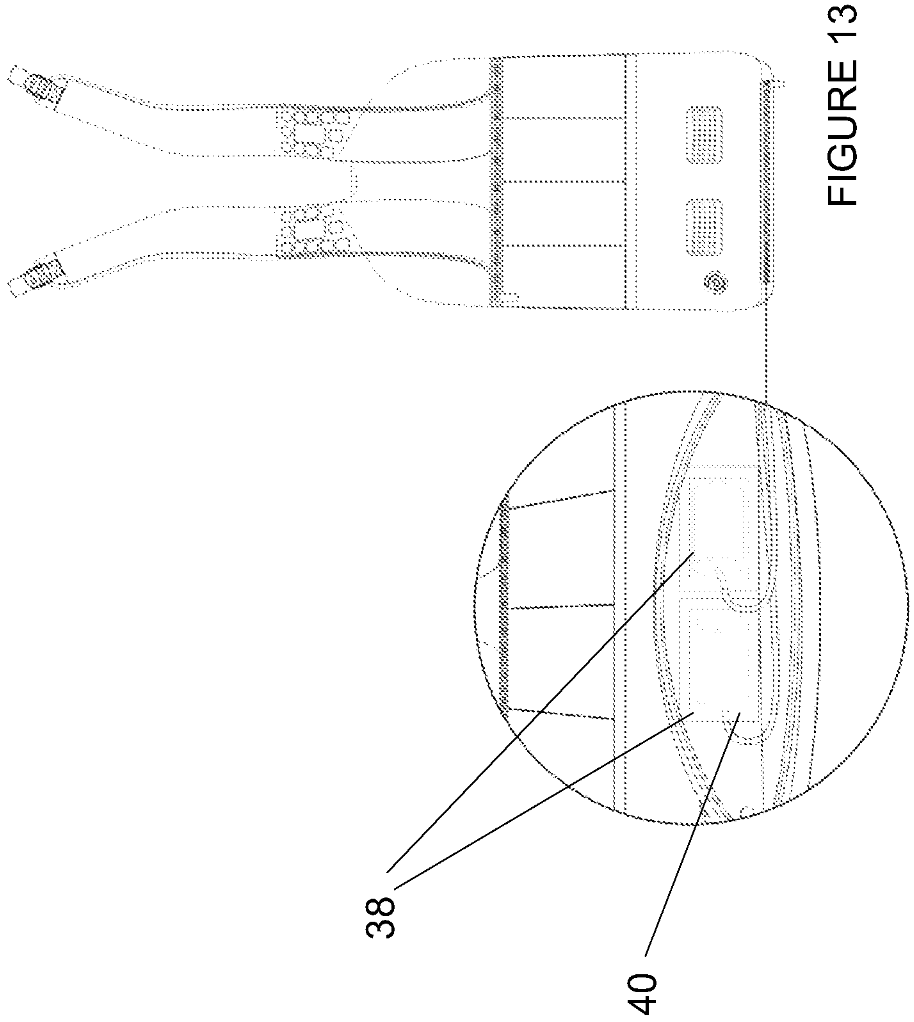
Figure 14:
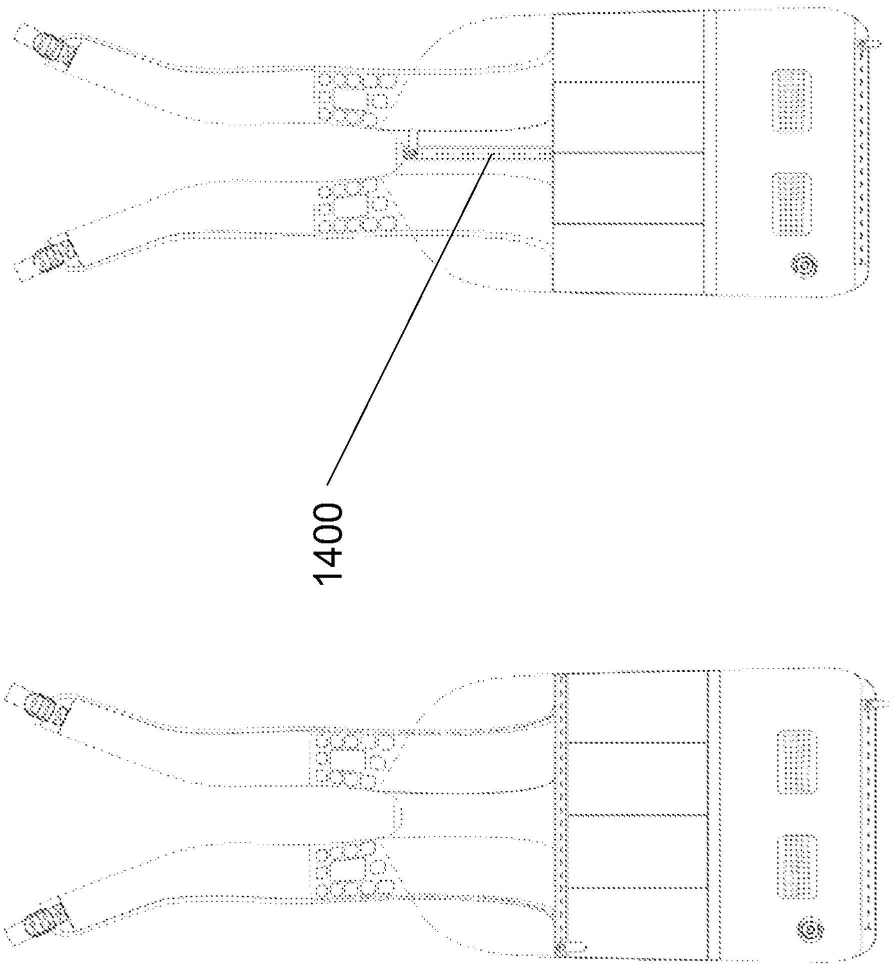

With reference to FIGS. 1-18, the present invention provides a massaging apparatus system with a convenient manufacturing and replaceable structure comprising, a body (10) having at least one shoulder strap (12), and a back panel (14), both (the shoulder strap and back panel) having a first inner layer (30), a second inner layer (36), a first outer layer (34) and a second outer layer (32); an opening (1000) on the body and an opening fastener (1002); at least one massage head (16); a control circuit (18) having at least one cable (20) connecting with the at least one massage head (16), a substantially closed storage space (26) between the first inner layer and the second inner layer, wherein the massage apparatus system is stored in the substantially closed storage space (26), wherein the first outer layer (34) is located on a portion of the body that communicates with the user when worn, the first inner layer (30) having a small storage space (38) fixed firmly on the first inner layer (30) and configured to receive the at least one massage head (16) and having a second opening (40) for the at least one massage head and cable to go through. The opening fastener may be a zipper. The material of the small storage space (38) may be flexible to hold the massage head tightly yet also be convenient to take out the massage head. The flexible material of the small storage space may be, for example, elastic fabric, foamy material, neoprene, rubber, silica, leather, leatherette or synthetic materials. The opening on the body (1000) may be at least 40 mm width, this allows for easy removal and insertion of the massage apparatus system. There may be a function control board (15, 42) in communication with the control circuit (18), which may be connected by a cable (20). The function control board (15, 42) may be fixed (or attached) on the body with a substantially rigid material base (17) to keep it firmly in place. This keeps the function control board immobile, secure is one place and easy to be used. There may be at least one passageway (28) between the substantially closed storage space and the shoulder strap, wherein the massage head and the cable pass through the at least one passageway. The function control board may have a button (1100), and the function control board is fixed at a hole (1102) in the first inner layer and first outer layer. The function board control button (1004) may be located on the shoulder strap (12), back (14) or waist belt (1801). The cable between the function control board and the control circuit may have a fastener (41, 50) inside the substantially closed storage space (43). If a portion of the massaging apparatus system is broken, this fastener can disconnect the control circuit allowing the massaging apparatus system to be replaced without taking off the fixed control board. The body may have a power source storage space (2001) and a power source (2002), and a cable (2003) extends from the substantially closed storage space to the power source. The body may have a third opening (1200) on the shoulder strap having a size of at least 40 mm and adjacent to the small storage space (1202) for easy removal and replacement of the massage head. The distance between the third opening and the small storage space for massage head is at least 5 mm. This provides a distance for stitching allowance and makes the massage head away from the seam to avoid noise. The third opening (1104, 1400) may also be on the body between the shoulder straps.

The cable may fork to at least two cables to connect with at least one of the control circuit, the massage heads in the body, a power source and the function control board. There may also be a third cable, wherein the third cable has at least one fast connector (50) that connects and disconnects to a power source and the control circuit. The control circuit may also have at least one fast connector (50) detachably connecting the fast connector on the cable. FIGS. 5, 6, 7, 8 and 9 depict a fast connector (50)

There may be a second massage head (1204) on the waist part (1206) of the body. This may be along the back portion of the wearer. The body may have a fourth opening (1205) adjacent to the second massage head and having a size of at least 40 mm to open and close the storage space with a fastener. The substantially closed storage space may be a detachable panel (1901) of the body.

Figure 15:
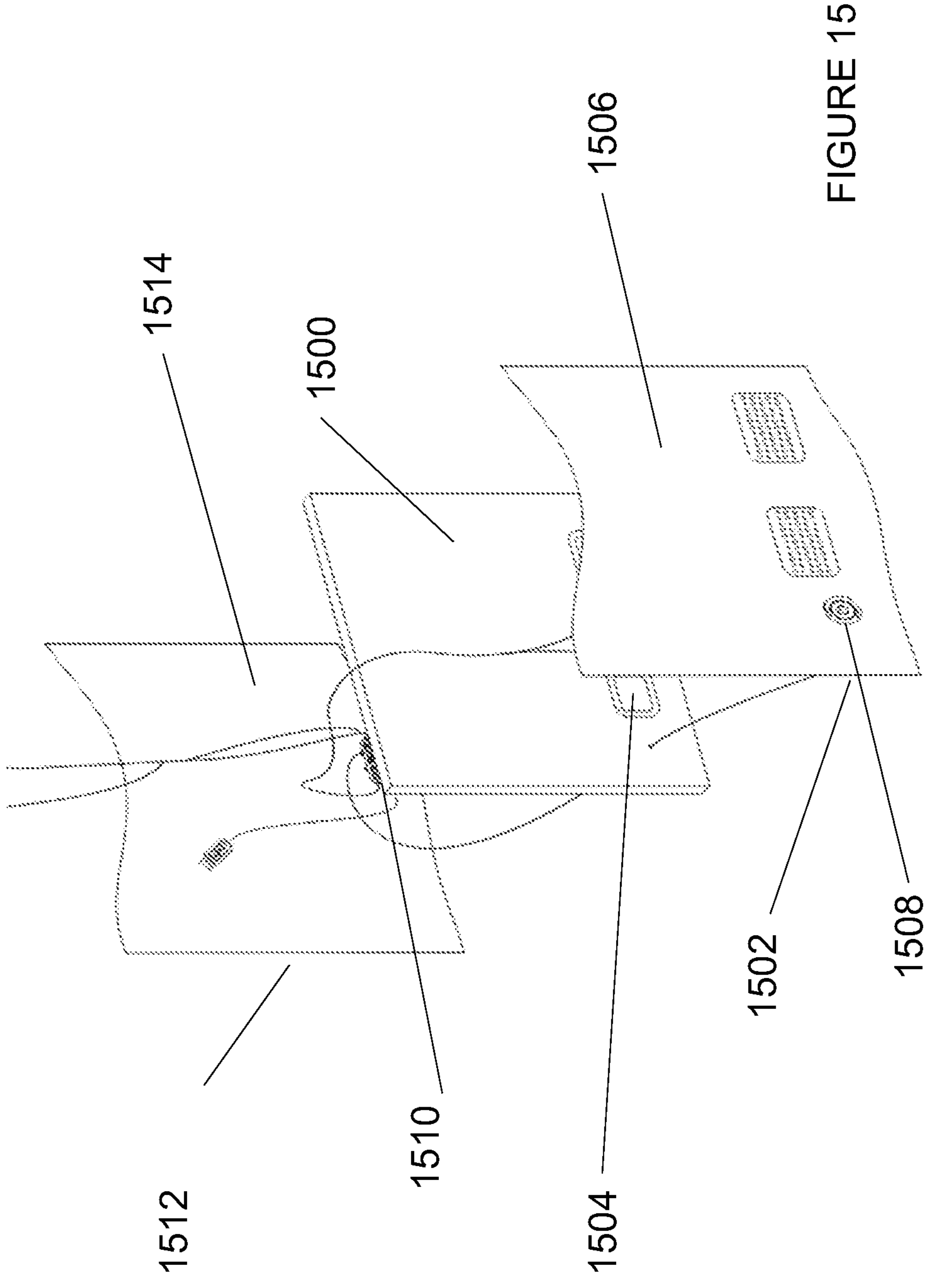
Figure 16:
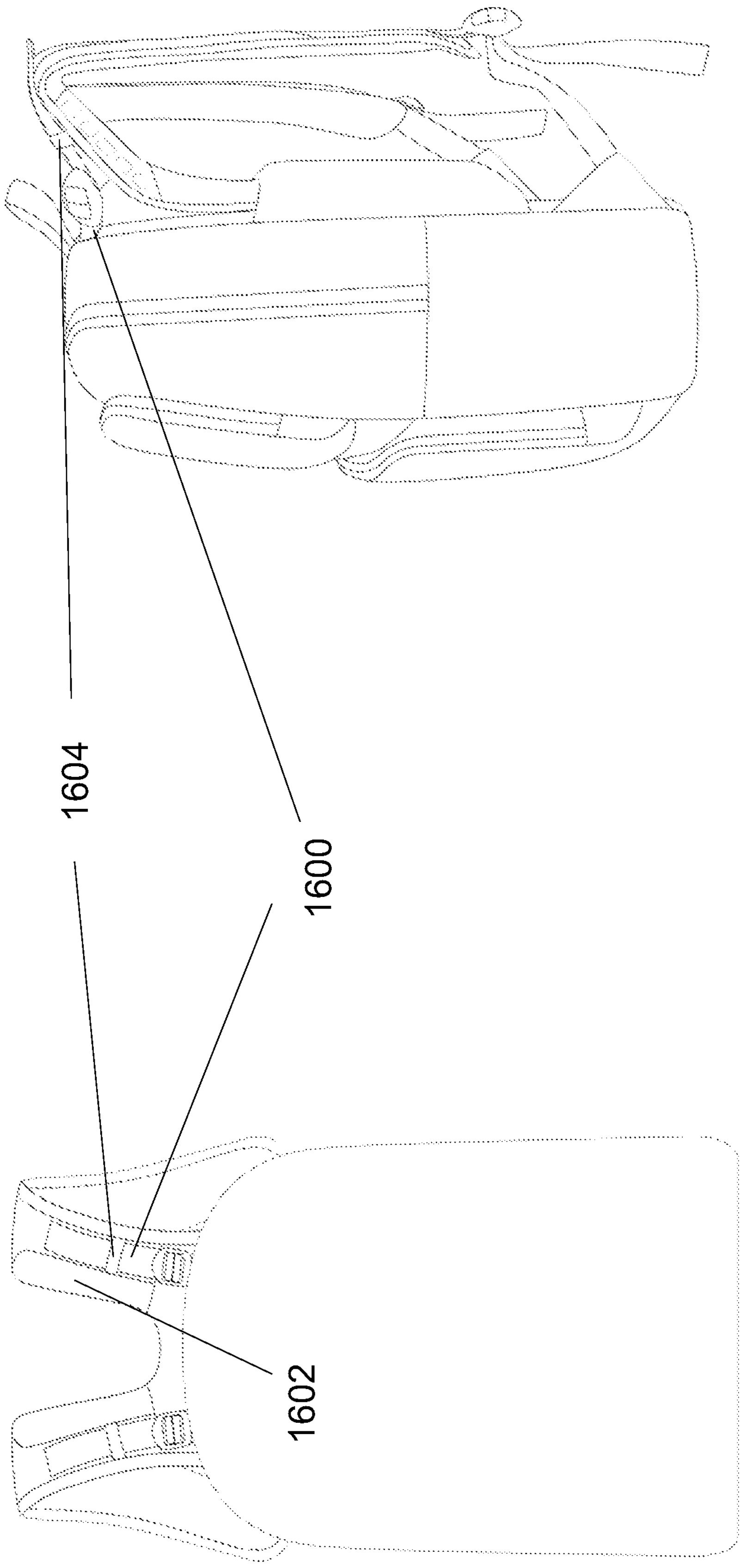
Figure 17:
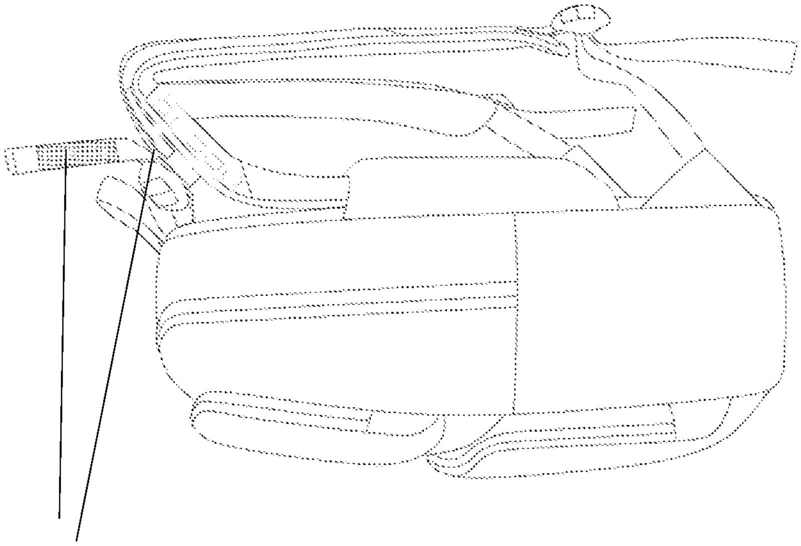
Figure 18:
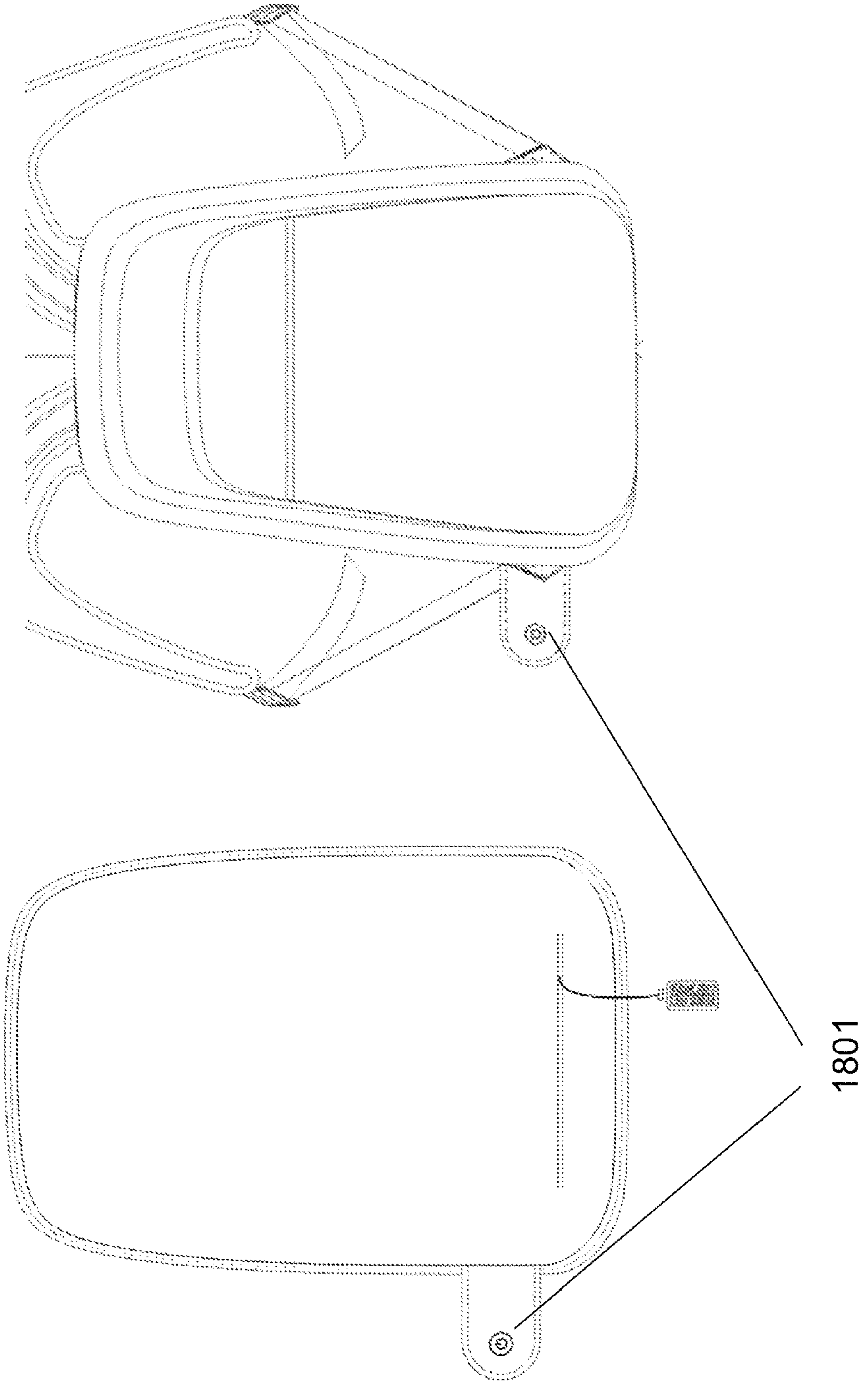
Figure 19:
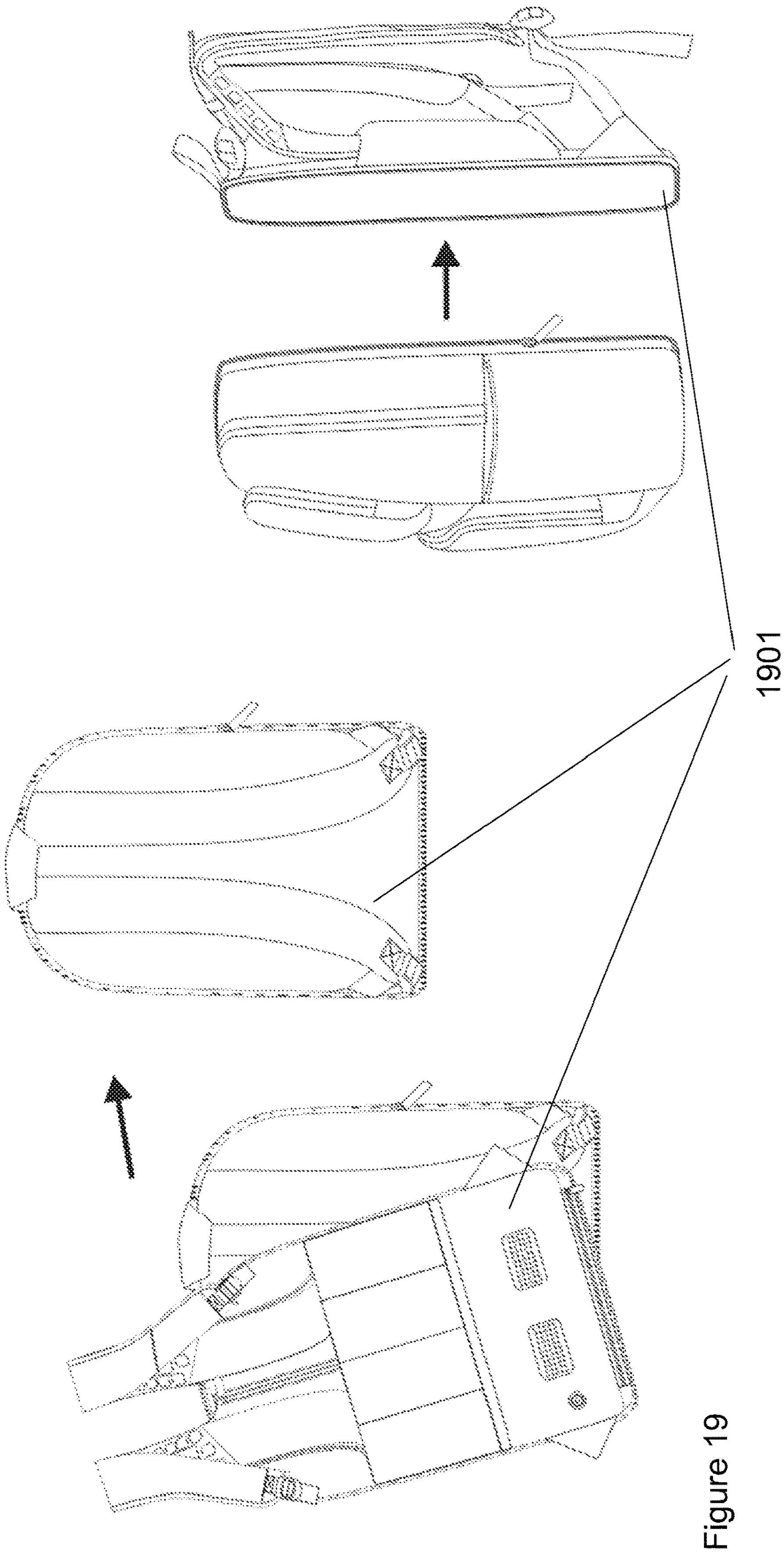
Figure 20:
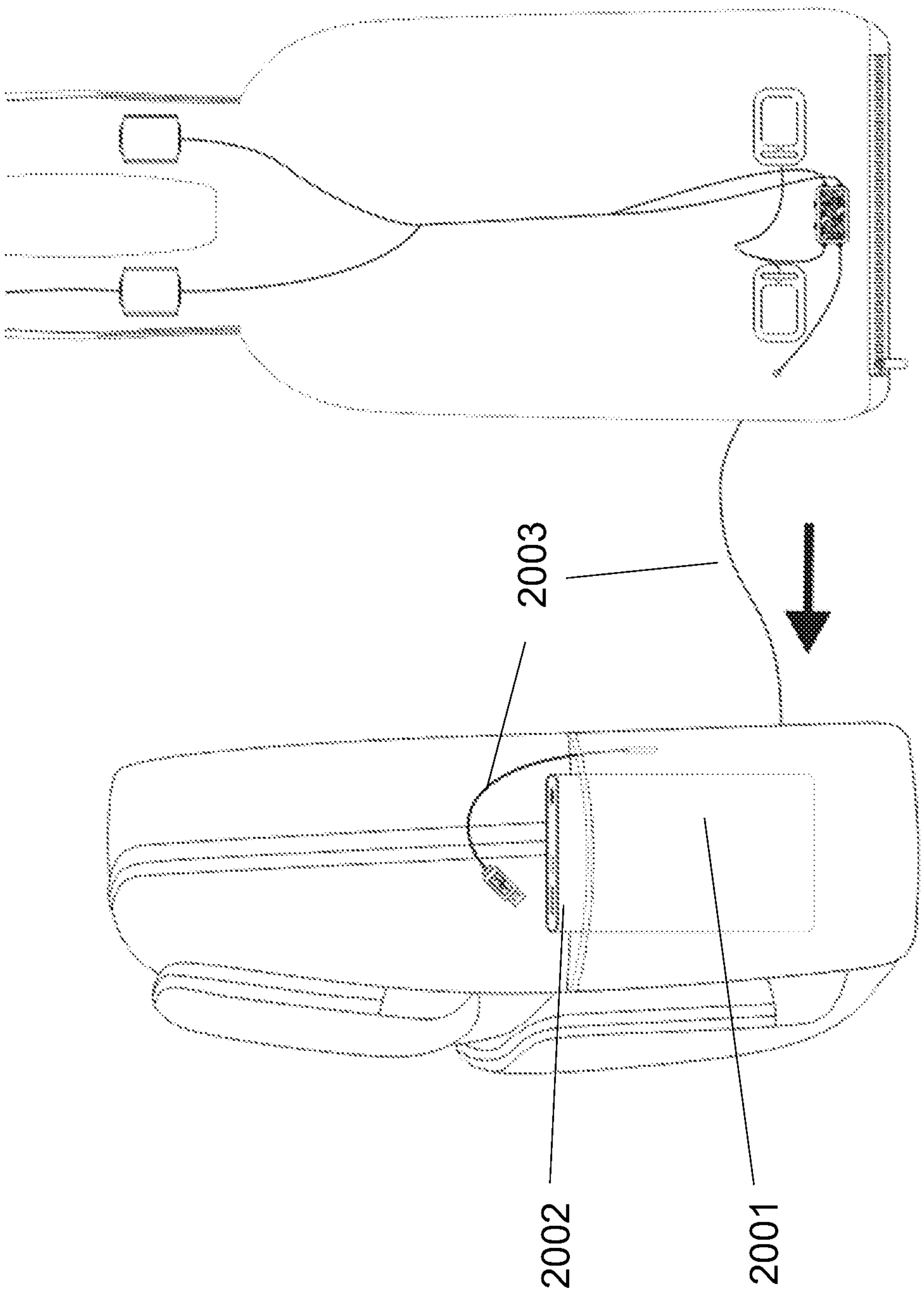

As shown in FIG. 15, there may be a foam material (1500) with a thickness of at least 1 mm and attached between the massage head (1504) and the control circuit (1510). This reduces the noise resulting from the resonance of the massage head. The foam material with a thickness of at least 1 mm may also be attached between the cables and the massage head to reduce noise. The control circuit (1510) may be between the second inner layer (1514) and the foam material (1500). The second outer layer is the opposite side to the second inner layer (1514). The first outer layer (1506) is the opposite side to the first inner layer (1502), they may have a function control board (1508) on it.

There may be a webbing (1600) on top of the shoulder strap (1602) to strengthen the shoulder strap (1602) and a loop (1604) on the shoulder strap (1602) holding the webbing (1600). The loop on the shoulder strap holds the webbing and ends to reduce the noise from the webbing waving. The webbing on top of the shoulder strap may be connected to the body to strengthen the shoulder strap and there may be a pair of hook and loop fasteners (1700) on the shoulder strap and the webbing sticking the webbing ends. This reduces the noise from webbing waving.

The described embodiments of the invention are intended to be exemplary and numerous variations and modifications will be apparent to those skilled in the art. All such variations and modifications are intended to be within the scope of the present invention as defined in the appended claims. Although the present invention has been described and illustrated in detail, it is to be clearly understood that the same is by way of illustration and example only, and is not to be taken by way of limitation. It is appreciated that various features of the invention which are, for clarity, described in the context of separate embodiments may also be provided in combination in a single embodiment. Conversely, various features of the invention which are, for brevity, described in the context of a single embodiment may also be provided separately or in any suitable combination. It is appreciated that the particular embodiment described in the specification is intended only to provide an extremely detailed disclosure of the present invention and is not intended to be limiting.

Modifications of the above disclosed apparatus and methods which fall within the scope of the invention will be readily apparent to those of ordinary skill in the art. Accordingly, while the present invention has been disclosed in connection with exemplary embodiments thereof, it should be understood that other embodiments may fall within the spirit and scope of the invention, as defined by the following claims.

I claim:

1. A massaging apparatus system with a convenient manufacturing and replaceable structure, comprising, a body having at least one shoulder strap, and a back panel, each of the at least one shoulder strap and the back panel having a first inner layer, a second inner layer, a first outer layer and a second outer layer;
- a first opening on the body and an opening fastener;
- at least one massage head;
- a control circuit having at least one cable connecting with the at least one massage head; and
- a substantially closed storage space between the first inner layer and the second inner layer of the back panel, wherein the control circuit is stored in the substantially closed storage space, wherein the first outer layer of the at least one shoulder strap is located on a portion of the body that communicates with the user when worn, the first inner layer of the at least one shoulder strap having a small storage space fixed firmly on the first inner layer and configured to receive the at least one massage head and having a second opening for the at least one massage head and cable to go through.

2. A massaging apparatus system with a convenient manufacturing and replaceable structure as in claim 1, further comprising at least one passageway between the substantially closed storage space and the shoulder strap, wherein the massage head and the cable pass through the at least one passageway.

3. A massaging apparatus system with a convenient manufacturing and replaceable structure as in claim 1, further comprises a function control board in communication with the control circuit.

4. A massaging apparatus system with a convenient manufacturing and replaceable structure as in claim 3, wherein the function control board is connected to the control circuit by a function control cable.

5. A massaging apparatus system with a convenient manufacturing and replaceable structure as in claim 3, wherein the function control board is fixed on the body with a substantially rigid material base to keep it firmly in place.

6. A massaging apparatus system with a convenient manufacturing and replaceable structure as in claim 3, the function control board comprises a button, and the function control board is fixed at a hole (1102) in the first inner layer and first outer layer.

7. A massaging apparatus system with a convenient manufacturing and replaceable structure as in claim 3, wherein the function control cable between the function control board and the control circuit further comprises a fastener.

8. A massaging apparatus system with a convenient manufacturing and replaceable structure as in claim 1, wherein the flexible material of the small storage space is selected from the group consisting of elastic fabric, foamy material, neoprene, rubber, silica, leather, leatherette, synthetic.

9. A massaging apparatus system with a convenient manufacturing and replaceable structure as in claim 1, wherein the body has a power source storage space and a power source, and a power cable extends from the substantially closed storage space to the power source.

10. A massaging apparatus system with a convenient manufacturing and replaceable structure as in claim 1, wherein the body further comprises a third opening on the shoulder strap having a size of at least 40 mm and is adjacent to the small storage space.

11. A massaging apparatus system with a convenient manufacturing and replaceable structure as in claim 10, wherein the distance between the third opening and the small storage space for massage head is at least 5 mm.

12. A massaging apparatus system with a convenient manufacturing and replaceable structure as in claim 1, wherein the cable forks to at least two cables to connect with at least one of the control circuit, the at least one massage head in the body, a power source, and a function control board.

13. A massaging apparatus system with a convenient manufacturing and replaceable structure as in claim 1, wherein the function control cable has at least one fast connector that connects and disconnects to function control board.

14. A massaging apparatus system with a convenient manufacturing and replaceable structure as in claim 1, wherein the at least one massage head further comprises a second massage head on a waist part of the body.

15. A massaging apparatus system with a convenient manufacturing and replaceable structure as in claim 14, the body further comprising a second massage head opening adjacent to the second massage head and having a size of at least 40 mm to provide access to the second massage head.

16. A massaging apparatus system with a convenient manufacturing and replaceable structure as in claim 1, the control circuit further comprising at least one fast connector detachably connecting with a mating fast connector on the cable.

17. A massaging apparatus system with a convenient manufacturing and replaceable structure as in claim 1, wherein the substantially closed storage space is a detachable panel of the body.

18. A massaging apparatus system with a convenient manufacturing and replaceable structure as in claim 1, wherein the function board control button is located on the shoulder strap, back or waist belt.

19. A massaging apparatus system with a convenient manufacturing and replaceable structure as in claim 1, further comprising a foam material with a thickness of at least 1 mm and attached between the first inner layer and the at least one massage head.

20. A massaging apparatus system with a convenient manufacturing and replaceable structure as in claim 1, further comprising a foam material with a thickness of at least 1 mm located adjacent to the at least one massage head.

21. A massaging apparatus system with a convenient manufacturing and replaceable structure as in claim 1, wherein the opening fastener is a zipper.

22. A massaging apparatus system with a convenient manufacturing and replaceable structure as in claim 1, further comprising a webbing on top of the shoulder strap to strengthen the shoulder strap and a loop on the shoulder strap holding the webbing.

23. A massaging apparatus system with a convenient manufacturing and replaceable structure as in claim 1, wherein a webbing on top of the shoulder strap is connected to the body to strengthen the shoulder strap and wherein a pair of hook and loop fasteners on the shoulder strap and on the webbing secure ends of the webbing.

* * * * *